United States Patent
Wilson et al.

(10) Patent No.: US 7,433,355 B2
(45) Date of Patent: Oct. 7, 2008

(54) FILTER BASED LONGEST PREFIX MATCH ALGORITHM

(75) Inventors: David James Wilson, Kanata (CA); Bashar Said Bou-Diab, Ottawa (CA)

(73) Assignee: Alcatel Lucent, Paris (FR)

( * ) Notice: Subject to any disclaimer, the term of this patent is extended or adjusted under 35 U.S.C. 154(b) by 856 days.

(21) Appl. No.: 10/773,225

(22) Filed: Feb. 9, 2004

(65) Prior Publication Data

US 2005/0175010 A1    Aug. 11, 2005

(51) Int. Cl.
H04L 12/56    (2006.01)

(52) U.S. Cl. .................. 370/392; 370/395.32; 707/6

(58) Field of Classification Search ............. 370/392, 370/351, 356, 395.31; 707/3, 6, 102, 104.1; 715/500; 703/3; 713/201; 711/5, 107
See application file for complete search history.

(56) References Cited

U.S. PATENT DOCUMENTS

| | | | |
|---|---|---|---|
| 6,018,524 A | | 1/2000 | Turner |
| 6,212,184 B1 * | | 4/2001 | Venkatachary et al. ...... 370/392 |
| 6,490,592 B1 * | | 12/2002 | St. Denis et al. ............ 707/102 |
| 6,499,081 B1 * | | 12/2002 | Nataraj et al. ............... 711/108 |
| 6,560,610 B1 * | | 5/2003 | Eatherton et al. ........ 707/104.1 |
| 6,570,866 B1 | | 5/2003 | Murase et al. |
| 6,839,703 B2 * | | 1/2005 | Jinzaki ........................... 707/3 |
| 6,947,931 B1 * | | 9/2005 | Bass et al. ..................... 707/6 |
| 7,031,320 B2 * | | 4/2006 | Choe ..................... 370/395.31 |
| 7,120,630 B2 * | | 10/2006 | Bass et al. ..................... 707/6 |
| 7,219,184 B2 * | | 5/2007 | Stojancic ....................... 711/5 |
| 2004/0085953 A1 * | | 5/2004 | Davis ........................ 370/356 |
| 2005/0086520 A1 * | | 4/2005 | Dharmapurikar et al. ... 713/201 |
| 2005/0144553 A1 * | | 6/2005 | Bass et al. .................. 715/500 |

FOREIGN PATENT DOCUMENTS

EP    1156432    11/2001

OTHER PUBLICATIONS

Gupta, et al., Algotrithms for Packet Classification, Stanford University, 2001.
Dharmapurikar, Sarang, et al., Longest Prefix Matching Using Bloom Filters, Washington University in St. Louis, St. Louis, MO, 2003.

* cited by examiner

Primary Examiner—Chi H. Pham
Assistant Examiner—Albert T Chou

(57) ABSTRACT

Methods directed to longest prefix matching and systems directed to IP address lookups are presented. The methods and systems relate in particular to IPv6 and comprise finding the longest prefix match (LPM) for an IP address. The method of the invention results in the use of filters to perform LPM. In embodiments of the invention, partial address filtering is used to further reduce filtering requirements. Reducing the number of filtering operations has the advantage of making the LPM algorithm faster and less costly to implement than prior art approaches. Also described is an "ideal offset filter" that extracts a fixed sized sliding window of bits from the IP address being processed.

22 Claims, 3 Drawing Sheets

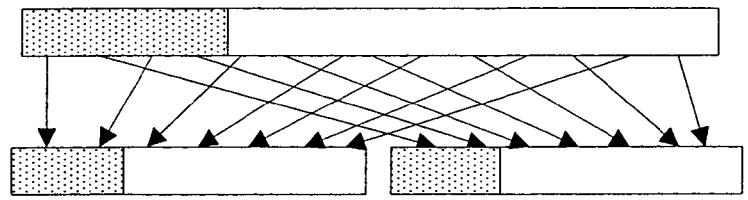
Figure 1 - Basic Bit Interleaved Filter
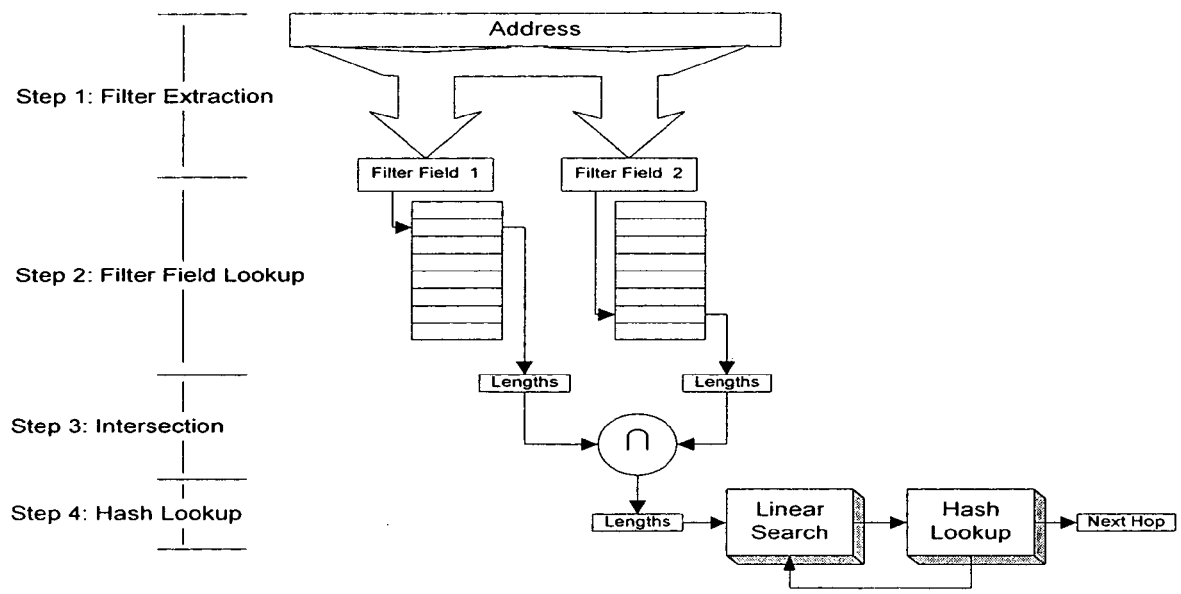
Figure 2 - Complete Lookup

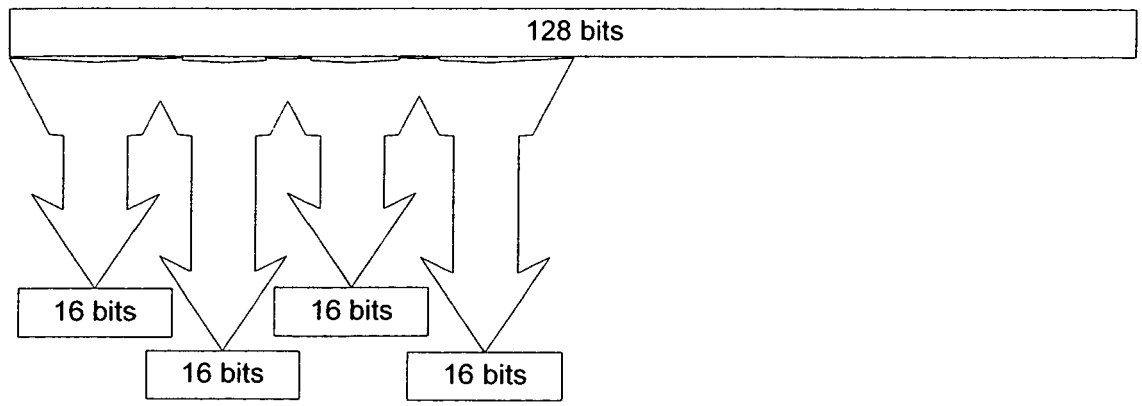
Figure 3 - IPv6 Basic Filter
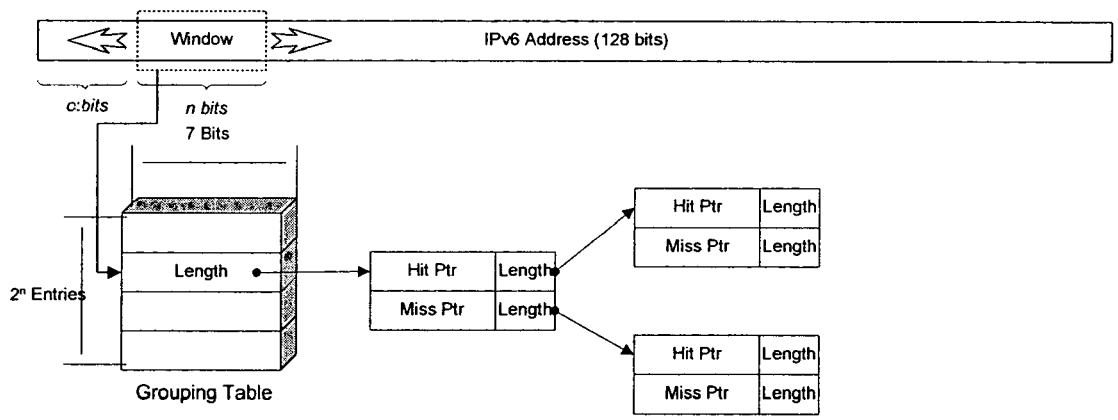
Figure 4 - Algorithm Using Ideal Offset

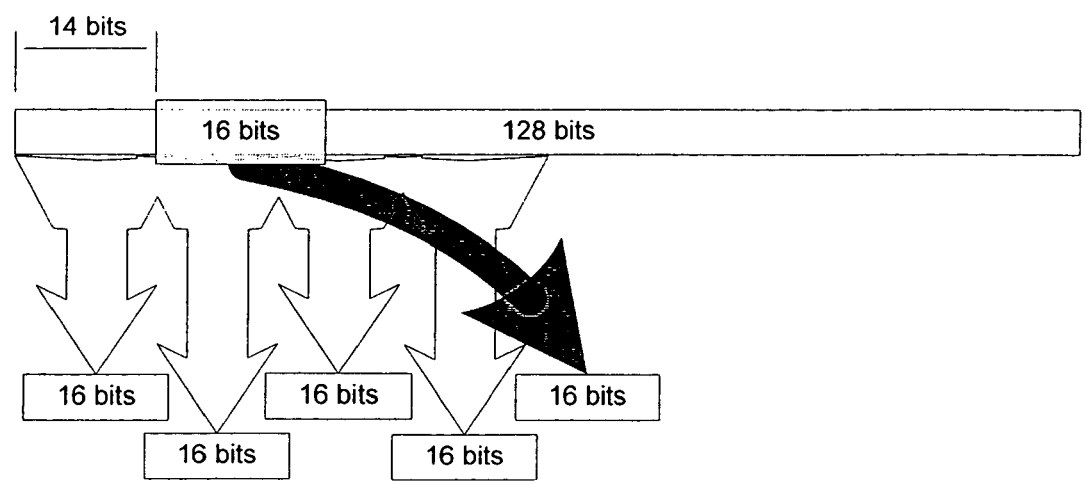
Figure 5 - Additional filter based on the ideal offset

FILTER BASED LONGEST PREFIX MATCH ALGORITHM

FIELD OF THE INVENTION

This invention relates to computer based communications networks and more particularly to systems and methods of performing Longest Prefix Match (LPM) lookups which may be used, for example, in routing decisions in such networks.

BACKGROUND

Communications networks, such as the Internet, employ addressing information in a packet header to forward the packet between networks towards the destination node. Typically, routing information is hierarchical in nature such that a destination address will include the address of the network and any sub-networks that host the destination node. This hierarchical routing information is similar to a 10 digit telephone number in which the first three digits identify the area code of a service area, the second three a specific switch in the area and the last four an end user serviced by the switch. Thus, when a call is placed by a call originator the switch to which the caller is connected need only determine the area code in order to direct the call to the appropriate area of the country. Similarly, a router often looks at the hierarchical routing information in an IP address to determine a next hop rather than concern itself with the complete address of the destination node. Unlike telephone numbers, the lengths of the prefixes in IP addresses are not fixed, making the lookup more complicated.

As the expectations of Internet services increase so too does the requirement to improve bandwidth. There are many factors affecting the speed at which data flows through the Internet, such as line rates, data quality of service, etc. One main factor dictating performance is the time taken in routing decisions. While improving routing decisions may not add significantly to the overall service delivery for low-speed dial up services where the line rate is typically the bottle neck, the speed of routing decisions becomes the limiting factor to bandwidth on faster transmission media, such as optical links, hence, the justification for this algorithm.

As the number of users of the Internet increases, so too does the demand for unique addresses. As a result, the IPv4 32 bit address space, which provide up to $2^{23}$ unique addresses, is being rapidly exhausted. Techniques such as Network Address Translation have been proposed to extend the usability of the IPv4 address space, but these solutions break transparent end-to-end connectivity. IPv6, having a 128 bit address field, has been introduced in part to improve the address space issue.

The net result of the increased address header is that each router must look at, potentially, a much longer address in order to make a routing decision. Additionally, the ability to address more nodes means that IPv6 routing tables could potentially contain more routes than were possible with IPv4.

As indicated previously, the hierarchical addressing scheme enables a router to group nodes into networks. This reduces the number of entries in the routers forwarding tables, as a router can make a routing decision based on matching only the network part, prefix, of an address and not the entire address.

Prefix matching involves comparing part of an address with entries in a routing table. An exact match algorithm will, of course, give the best routing information quickly but typically such a search will require tables which are impractically large and difficult to update. A technique in which the longest prefix match is determined has evolved as a solution.

As routers forward at higher speeds, the time-efficiency of the forwarding algorithm can make a significant impact on the performance of the system. More efficient algorithms such as the one provided by this invention will allow higher system throughput to be achieved.

It should be noted that this algorithm is intended for IPv6 but there is no reason why it could not be used for IPv4 or any other application requiring an LPM search.

The prior art relating to IP routing lookups includes U.S. Pat. No. 6,018,524 which issued Jan. 25, 2000 to Turner et al. The Turner et al. patent discloses an algorithm that performs a binary search on prefix lengths using hash tables. In order to facilitate a binary search with a hash table, markers must be inserted in the hash table to indicate the presence of entries at longer prefix lengths in the routing table. Markers provide an indication that there is a longer prefix in the table which could provide a better match and could also contain the next hop information for a shorter prefix which would have been found had the current lookup resulted in a miss. These markers can occupy a significant portion of the hash tables, and can account for 10% to 60% (30% typical) of the contents of the hash table, resulting in more frequent hash collisions. In the case of IPv6, using this algorithm could require up to seven hash lookups, excluding collisions. There are additional schemes that could be used to marginally reduce the number of hash lookups at the cost of additional processing and additional tables.

A second prior art scenario is described by Dharmapurikar et al. entitled "Longest Prefix Matching Using Bloom Filters". This paper was presented at SIGCOMM 03, Aug. 25-29 2003 in Karlsruhe Germany. The paper describes the use of a set of filters (hash functions) to determine in which set of prefix lengths an address belongs. The set of lengths is then searched in a hash table in linear order. In order to determine which prefix lengths are possible for a particular address one filter must be used for each prefix length that exists in the routing table. To allow for any possible routing table for IPv6, 128 filters must exist. In order to perform the filtering efficiently, this algorithm is limited to hardware implementation with large transistor/gate count to achieve a desirable level of processing parallelism.

Performing hash lookups is a costly operation, especially for IPv6. A hash function needs to be applied to the key, and a portion of the result is used to index an entry in memory. Since hashing is not a one-to-one mapping, collisions must be detected, which requires storing the original 16 byte (128 bit) IPv6 address, or a portion of it, in each hash table entry. Collisions could be resolved in a number of ways, but they typically require additional memory accesses, and additional information in each hash entry. In total, this is roughly 20 bytes of pure overhead that must be loaded at every hash lookup. As a result of the properties of using a hash table, the goal is to reduce the number of hash lookups, and the number of hash entries.

The majority of other IP forwarding algorithms which presently exist are tree based. Thus, their performance characteristics depend directly on the number of bits in the address and the number of entries in the routing table. Due to the length of the IPv6 address, existing tree based IPv4 forwarding algorithms do not scale up to IPv6 size addresses well in terms of memory storage and memory accesses. Using these algorithms would result in an explosion of the size of routing table data structures and an increase in the number of memory latencies needed to perform the look up. Additionally, existing look-up algorithms do not take advantage of several properties of IPv6 addresses that were designed to make IPv6 forwarding simpler such as hierarchical addressing. In fact, these IPv6 addressing properties are more likely to reduce the performance of existing IPv4 look up algorithms rather than increase in it.

SUMMARY OF THE INVENTION

The present invention seeks to overcome the limitations of the prior art by taking a different approach to reducing the number of hash lookups required for performing a longest prefix match. Partial address filtering is used to reduce the number of hash lookups. Reducing the number of filters and filtering operations has the advantage of making the LPM algorithm faster and less costly to implement compared to the closest prior art approach. For further performance improvements some embodiments use additional filters such as an ideal offset filter which extracts a fixed size sliding window from the IP address being processed to further narrow search results.

Therefore in accordance with a first aspect of the present invention there is provided a method of forming a longest prefix match comprising the steps of: a) filtering a key into a plurality of filter fields, each of which is associated with a respective filter table; b) performing a longest prefix match (LPM) operation on each of the filter fields in their respective filter tables, wherein each LPM operation yields a result indicating a set of lengths of prefixes potentially matching the key; c) intersecting the results to further reduce the set of potential prefix lengths; and d) performing a series of hash lookups, based on the previously indicated potential prefix lengths, beginning with the longest potential prefix length and progressing to successively shorter potential prefix lengths until a matching prefix is found, which is the longest prefix matching the key.

In accordance with a second aspect of the present invention there is provided a system for performing a longest prefix match comprising: a plurality of filter fields each created by filtering a key, each filter field being associated with a filter table; means to perform a longest prefix match (LPM) operation in each of the filter fields in their respective filter tables, wherein each LPM operation yields a result indicating a set of potential prefix lengths for the longest prefix matching the key; means to intersect the results to reduce the set of potential prefix lengths; and means to perform a series of hash lookups, based on the previously indicated potential prefix lengths, beginning with the longest potential prefix length and progressing to successively shorter potential prefix lengths until a matching prefix is found, which is the longest prefix matching the key.

BRIEF DESCRIPTION OF THE DRAWINGS

The invention will now be described in greater detail with reference to the attached drawings wherein:

FIG. 1 illustrates a basic bit interleaved filter;

FIG. 2 provides an overview of the lookup algorithm and data structure according to the present invention;

FIG. 3 illustrates a variation of the process involving a partial filter;

FIG. 4 illustrates a sliding window of fixed size to select an ideal grouping of bits; and FIG. 5 illustrates a further embodiment wherein the filter is based on an ideal offset.

DETAILED DESCRIPTION OF THE INVENTION

This invention makes use of a process called filtering which is a generic operation that selects some number of bits from a field and concatenates them, preserving the original order of the bits, to form a filter field. Since the bit order is preserved the prefix information contained in the address is passed down to the filter fields, each having its own smaller prefix. Consequently, a longest prefix match of the filter field in the associated filter field table is logically a partial match of the original search key. This partial match indicates a set of prefix lengths for which there may be a prefix matching the search key. Any number of filter fields can be used, each associated with its own filter field table. Each filter field may use a different method for extracting bits from the search key.

One particular type of filter implementing this process is called a bit interleaved filter. Bit interleaving is the process of taking an address and dividing it into filter fields, such that the first bit of the address becoming the first bit of the first filter field, the second bit of the address becoming the first bit of the second filter field, the third bit of the address becoming the second bit of the first filter field and the fourth bit of the address becoming the second bit of the second filter field and so on. This bit interleaving process is shown in FIG. 1. The shaded areas indicate the prefix portion of the key and the resulting filter fields.

The present invention can be decomposed into four steps. FIG. 2 pictorially illustrates a high level view of the invention and the steps involved in performing the algorithm.

The first step of the algorithm, shown in FIG. 2, is the filter field extraction step. This is conducted by filtering the search key or the IP address with a plurality of filter field extraction methods to produce a set of filter fields. Each filter field is like a small key for its associated filter table.

The second step involves using the filter fields from step 1 to perform an LPM lookup on each field in parallel in its respective filter table. Any LPM algorithm could be used to perform these searches, including a straight array lookup or any tree lookup. The choice of look up algorithm would depend on the number and size of the filter fields. The result of each lookup will be a bit field, 128 bits long in the case of IPv6, in which each bit indicates a prefix length for which there is a prefix that potentially matches the search key. As a result of these lookups, several sets of potential prefix lengths are determined. These sets of prefix lengths can be further reduced by finding the intersection of the sets to produce a definitive set of prefix lengths. As such, the references in the Figures to lengths should be understood to be references to prefix lengths. This final set of potential prefix lengths may contain one or more set bits, which can be further classified. One of the set bits potentially indicates the length of the longest matching prefix, any bits higher than this bit are false positives, and all bits below this bit indicate shorter matching prefixes and additional false positives. It is important to note that the filtering process would never result in false negatives, in which an actual matching prefix does not have its length indicated in the final set of potential prefix lengths.

Following the results of the intersection there is performed a series of hash lookups where the possible prefix lengths are used to search for prefixes matching the key in a hash table that logically groups prefixes by length. For simplicity a linear search, shown in FIG. 2, is used to locate matching prefixes, beginning with the longest potential prefix length. The linear search continues until the first match, which is the longest matching prefix, occurs. It is to be understood that other search algorithms could be used in place of the linear search.

In addition to performing the LPM lookup algorithm the present invention also includes processes for inserting and deleting routing rules. Inserting a new route is as simple and fast as searching for an address. First, the route is added to the hash table of the corresponding prefix length. The prefix is then filtered and the filter fields are used as keys into the associated filter tables. The filter field tables are then updated, according to their associated LPM algorithm, and the entries associated with the key will have the proper bit set to indicate the presence of the prefix length of the new route.

Deletion of a routing rule is a bit more complicated than insertion. Fortunately this process can be broken into two parts: one of which can occur very quickly and ensures that the route is immediately removed from consideration, and the other can occur less frequently as a house-keeping function to reduce the number of filtering false positives. To delete a route it simply needs to be removed from the hash table. This will ensure that a lookup will never find this route. If the deleted route is the only instance of a particular prefix length, the filter tables may incorrectly indicate a potential hit of this prefix length during regular address lookups. Since the algorithm is designed to handle false positives such as this one, a false positive will only have a slight negative impact on lookup performance. To reduce the number of false positives the filter table must be updated. This is a slightly more processing-intensive task but it can be completed in several ways, each having its own benefits. The most obvious is to simply rebuild the filter tables periodically, the period expressed in either time or number of route updates. This, however, involves traversing the entire list of routing rules.

Other options for performing updates include implementing counting filters which count the number of prefixes that cause a particular length to be present in the filtering tables or traversing a tree representation by level and only looking at routes of a given length. Fortunately, this complex task need only be performed on a best effort basis.

Several variations of the invention are possible, each with its own performance characteristics. Each of these variations is defined by the number and definitions of its filters. Other variations are possible by replacing parts of the algorithm such as the hash lookup, linear search, etc.

One of the variations comprises partial address filtering. In IPv6, filtering every bit results in either too many filter fields or filter fields that are too large. In the partial address filtering scenario only a portion, for example the first 64 bits, of the IPv6 address is filtered. This is done by four 16 bit filters resulting in four fields. These filters start from bit position 0, 1, 2 and 3 and select every fourth bit. FIG. 3 shows an example of such a filter.

A further variation involves an ideal offset filter which is described in greater detail in co-pending U.S. application Ser. No. 10/718,524, filed Nov. 24, 2003. The contents of the co-pending application are incorporated herein by reference. FIG. 4 shows a sliding window of fixed size to select the ideal groupings of bits to best group addresses in order to reduce the number of prefix lengths within a group. In this embodiment the bits from the sliding window are used as the extra filter. There are two further aspects of this scenario. The first is simply to use statistics of the ideal location of the sliding window to build the filter. In this case the position of the sliding window is fixed as shown in FIG. 5. The second scenario is to dynamically determine the ideal position of the window based on the current routing table.

The algorithms set out in this application can be easily implemented in hardware, software, or a combination of both. Examples if implementation options include ASICS, FPGAs, GPPs, and NPs. It will be apparent to one skilled in the art that other platforms can be used as well.

The invention allows for a very low cost and extremely high speed longest prefix match implementation, that scales efficiently with key length and number of prefixes. When applied to IPv6, the invention takes advantage of the properties of IPv6 addresses while avoiding the scalability issues of IPv6.

While particular embodiments of the invention has been described and illustrated it will be apparent to one skilled in the art that numerous changes can be made without departing from the basic concept. It is to be understood, however, that such changes will fall within the full scope of the invention as defined in the appended claims.

The invention claimed is:

1. A method of performing a longest prefix match comprising the steps of:
  a) filtering a key into a plurality of filter fields, each of which is associated with a respective filter table;
  b) performing a longest prefix match (LPM) operation on each of the filter fields in their respective filter tables, wherein each LPM operation yields a result indicating lengths of prefixes potentially matching the key;
  c) intersecting the results to obtain a set of potential prefix lengths; and
  d) performing a series of hash lookups, based on the previously indicated potential prefix lengths, beginning with the longest potential prefix length and progressing to successively shorter potential prefix lengths until a matching prefix is found, which is the longest prefix matching the key.

2. The method as defined in claim 1 wherein each filter may use a different method for filter field extraction.

3. The method as defined in claim 1 wherein the key is an IP address.

4. The method as defined in claim 3 wherein the hash lookups are used for routing decisions.

5. The method as defined in claim 3 wherein the plurality of filter fields are created by extracting bits from the IP address.

6. The method as defined in claim 5 wherein the extracted bits are concatenated into filter fields, each filter field being a key for said associated filter table.

7. The method as defined in claim 1 wherein the longest prefix match operation on each filter field and associated filter table is performed in parallel.

8. The method as defined in claim 7 wherein a lookup table is used to perform the LPM operation.

9. The method as defined in claim 7 wherein a tree lookup is used to perform the LPM operation.

10. The method as defined in claim 1 applied to performing a new route insertion into a hash table.

11. The method as defined in claim 1 applied to the deletion of a route from a hash table.

12. The method as defined in claim 11 wherein the hash table is updated to delete the route.

13. The method as defined in claim 3 wherein only a portion of the IP address is filtered into filter fields.

14. The method as defined in claim 3 wherein the IP address is 128 bits long.

15. The method as defined in claim 3 wherein the IP address is 32 bits long.

16. The method as defined in claim 3 wherein an ideal offset filter is used.

17. A system for performing a longest prefix match, comprising:

a plurality of filter fields each created by filtering a key, each filter field being associated with a respecting filter table;

means to perform a longest prefix match (LPM) operation on each of the filter fields in their respective filter tables, wherein each LPM operation yields a result indicating potential prefix lengths of a longest prefix matching the key;

means to intersect the results to obtain a set of potential prefix lengths; and means to search multiple logical hash tables, each associated with a specific prefix length, for a longest prefix match, in a linear fashion, wherein the search is performed using the set of potential prefix lengths starting at the longest potential prefix length and progressing to successively shorter potential prefix lengths until a matching prefix is found.

18. The system as defined in claim 17 wherein the filter fields are bit interleaved filters.

19. The system as defined in claim 17 wherein the key is an IP address.

20. The system as defined in claim 17 wherein the LPM operation is performed in a lookup table.

21. The system as defined in claim 19 wherein the IP address is 128 bits long consistent with IPv6.

22. The system as defined in claim 19 wherein the IP address is 32 bits long consistent with IPv4.

* * * * *